United States Patent [19]

Hoshino et al.

[11] Patent Number: 4,689,669

[45] Date of Patent: Aug. 25, 1987

[54] COLOR GRAPHICS DATA PROCESSING APPARATUS

[75] Inventors: Masaaki Hoshino; Itaru Kawakami, both of Tokyo, Japan

[73] Assignee: Sony Corporation, Tokyo, Japan

[21] Appl. No.: 802,188

[22] Filed: Nov. 25, 1985

[30] Foreign Application Priority Data

Nov. 27, 1984 [JP] Japan ................... 59-250247
Nov. 28, 1984 [JP] Japan ................... 59-251270
Nov. 29, 1984 [JP] Japan ................... 59-252136

[51] Int. Cl.$^4$ ............................................ H04N 1/46
[52] U.S. Cl. ........................................ 358/80; 340/701; 358/76; 358/78; 364/526
[58] Field of Search ..................... 358/75, 76, 78, 80, 358/81; 356/402; 340/701; 364/526, 554

[56] References Cited

U.S. PATENT DOCUMENTS

| | | | |
|---|---|---|---|
| 4,090,243 | 5/1978 | Kotera | 356/402 |
| 4,203,671 | 5/1980 | Takahashi | 356/402 |
| 4,349,279 | 9/1982 | Jung | 356/402 |
| 4,511,989 | 4/1985 | Sakamoto | 358/75 |
| 4,578,673 | 3/1986 | Yianilos | 340/701 |
| 4,598,282 | 7/1986 | Pugsley | 340/701 |
| 4,646,134 | 2/1987 | Komatsu | 358/11 |

FOREIGN PATENT DOCUMENTS

58-142676 8/1983 Japan ................... 358/75

*Primary Examiner*—Howard W. Britton
*Attorney, Agent, or Firm*—Lewis H. Eslinger; Alvin Sinderbrand

[57] ABSTRACT

Apparatus for processing color graphics data converts an analog video information signal to a digital signal and stores one frame of the digital video signal corresponding to a desired still picture for display on a video monitor/receiver upon being read out from the storage element. The still picture read out from the storage element is also fed to a microcomputer in which a color picture corresponding to the displayed still picture is stored in a memory so that it may be displayed on the monitor and visually compared with the original picture. The data processing apparatus specifies a portion of the displayed picture and the appearance frequencies of respective colors relative to a plurality of picture elements contained within that specified portion are counted. These appearance frequencies are used to generate a limited number of colors in a color palette unit. When defining the colors of the color palette the data in the microcomputer memory is converted to a computer graphics bit length and read out through the color palette for display on the monitor. Also, the specified area can be moved on the picture and the appearance frequencies for each of the colors in each area are accumulated, so that the accumulated appearance frequencies can be used to specify the color palette colors.

20 Claims, 11 Drawing Figures

COLOR GRAPHICS DATA PROCESSING APPARATUS

BACKGROUND OF THE INVENTION

1. Field of the Invention

This invention relates generally to computer color graphics and, more particularly, to apparatus for processing color graphics information to select colors used in a computer graphics display.

2. Description of the Background

Selecting the colors of a picture to be displayed using computer graphics techniques is an important task in the computer graphics field. This becomes even more important when a video image derived from a video signal source, such as a video tape recorder or video disc player, is first stored in a memory and then subsequently displayed as a still picture using computer graphics techniques. Generally, the video signal image is processed using computer graphics techniques and such processed image data is stored in a memory. It is known to obtain such computer display of a still picture using a so-called color palette that contains a fixed, and usually limited, number of colors used in the display of the color picture. The color palette is really a digital memory unit that retains a limited number of colors used in generating the display. The colors available in the color palette are defined and fixed therein in advance and typically there is only a limited number of colors, for example, sixteen colors are usually defined on a color palette. In other words, in the majority of known color graphics data processing systems, there are only 16 colors available for the color display, and they are defined and fixed beforehand.

In previously proposed color graphics data processing systems, the colors that can be used to display the picture may be selected from a relatively large number of colors that are available independently. In that case then, the colors are selected for use by the operator or user who visually checks the original picture being displayed on the monitor and then selects colors to be used to make up the color palette for display of the still picture using the computer graphics. That is, a time consuming operation must occur in which the computer graphics operator selects the defined colors for the color palette by visual/manual means.

Then, when the user or operator wishes to produce a computer graphics color picture that is substantially equal to the original picture provided from the video signal source, it frequently becomes quite difficult to faithfully reproduce the desired colors using only the sixteen predetermined, fixed colors that have been selected in advance.

On the other hand, according to this known method of selecting and specifying the sixteen colors that are available for use in the color palette, it is possible to reproduce a picture having colors relatively close to the original picture by defining the color palette several times. This repetitive method involves an extremely labor intensive effort on the part of the operator, and it has proven quite difficult for the operator to select the optimum sixteen colors to define the color palette.

OBJECTS AND SUMMARY OF THE INVENTION

Accordingly, it is an object of the present invention to provide apparatus for processing computer graphics data that can eliminate the above-noted defects inherent in the prior art.

Another object of the invention is to provide apparatus in which color graphics data is automatically converted from the input color information to digital color information suitable for use in a color palette unit.

Still another object of this invention is to provide color graphics data processing apparatus in which color information contained within a specified portion of a color still picture is extracted and the peripheral or surrounding color graphics data are converted based on such extracted color information.

Another object of this invention is to provide color graphics data processing apparatus in which color information from picture elements contained within a specified portion of a color graphics still picture data is extracted from such portion and the colors of the entire picture are selected from a color palette based on the extracted information from the specified portion.

A still further object of this invention is to provide color graphics data processing apparatus in which color information from picture elements contained within a specified portion of the color graphics data is extracted from such portion and a corresponding color information signal is selected from a previously defined color palette.

According to one aspect of the present invention, color graphics data processing apparatus is provided having an analog-to-digital converter (A/D) that converts analog color video information signals to digital color information signals and a memory to store digital color information signals that correspond to a single desired picture of the digital color video signal produced by the A/D converter. A cathode ray tube monitor/receiver is provided to display the selected still picture that is then read out from the memory and reconverted to an analog video signal. A microcomputer is provided to which the picture read out from the memory can also be transferred such that a color picture corresponding to the still picture stored in the memory can be formed by the microcomputer using computer graphics techniques. The microcomputer ultimately reads out this stored picture, which has been color adjusted, and a color adjusted picture is displayed on the monitor/receiver in place of the still video picture originally fed thereto from the memory. The color graphics data processing apparatus includes means to specify a particular portion or area of the picture, which is being displayed on the monitor/receiver and which corresponds to the digital video signal read out from the memory. Then, by counting the frequency of occurrence or appearance of respective colors relative to a plurality of picture elements contained within the specified portion, and by accumulating the frequency of occurrence of each color in each area when a plurality of different picture portions are specified, a system that is responsive to these accumulated frequencies of occurrence specifies a number of colors (N) that can be used to display the color picture formed by the microcomputer using computer graphics techniques.

Additionally, according to the present invention, when an important portion of the picture is specified by a cursor and a plurality of such portions are subsequently specified by the cursor, the frequencies of occurrence of each color information of the specified portions are accumulated, so that a number of colors (N) are automatically defined based upon the sequential order of colors having the highest frequencies of occurrence.

The above and other objects, features, and advantages of the present invention will become apparent from the following detailed description of illustrative embodiments thereof to be read in conjunction with the accompanying drawings in which like reference numberals designate like elements and parts.

DETAILED DESCRIPTION OF PREFERRED EMBODIMENTS

Figure 1:
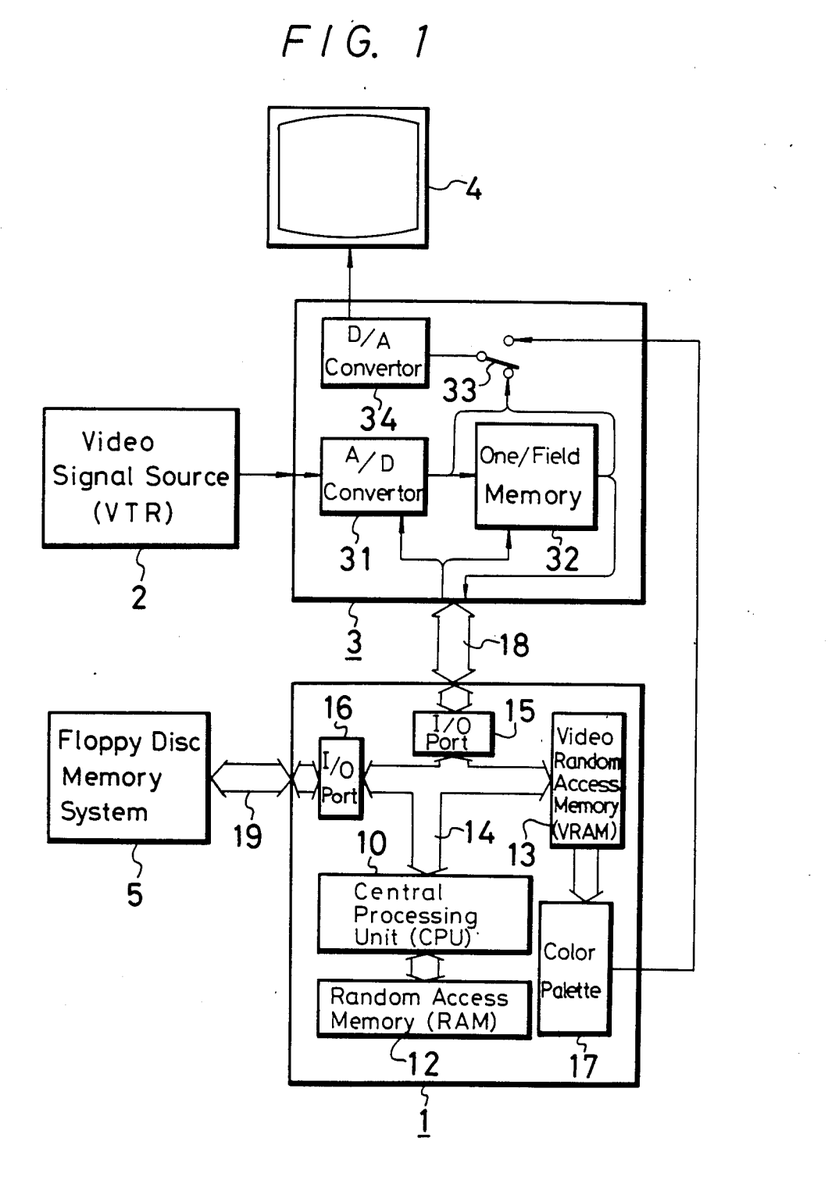
FIG. 1 is a schematic in block diagram form of computer graphics data processing apparatus according to the present invention.

FIG. 1 schematically illustrates an overall assembly of a color graphics data processing apparatus according to an embodiment of the present invention, in which a microcomputer 1 includes a central processing unit (CPU) 10 and a random access memory (RAM) 12, as is typically the case in such microcomputing apparatus. In this microcomputer 1, a video random access memory (VRAM) 13 is provided to store video data, and it is in data communication with central processing unit 10 by means of a bi-directional input/output (I/O) data bus 14. The elements located separate and apart from microcomputer 1, that is, the peripheral apparatus, are connected to microcomputer 1 through input/output (I/O) ports 15 and 16, which are comprised of well-known buffers and the like, and that are also in data communication with the other elements of microcomputer 1 by means of data bus 14. The video data that is stored in VRAM 13 may be delivered through a color palette 17 to a video monitor/receiver 4 as color graphics data. That is, the system provides for monitoring the processed color image by reading the color data from color palette 17 using the image data stored in the VRAM 13 as address data. As will be described hereinbelow, color palette 17 provides 16 possible colors for display, which that can be selected from 4096 ($2^{12}$) colors and, thus, the color graphics display is formed of these 16 selected colors. As is known, unlike conventional television signals, there is a limit to the digital field available for each word and typically in such computer graphics only enough digital storage space for sixteen different colors is available in the color palette.

The video image to be reproduced using the computer graphics system following the teaching of the present invention can be obtained from a video source 2, such as a video tape recorder or video disc player or video camera or the like. The analog video signal produced by video signal source 2 is fed to video processor circuit 3, which includes an analog-to-digital converter (A/D) 31, that converts the input analog video signal to a digital video signal. This digital video signal from A/D converter 31 is fed to a memory 32 that has a capacity to store only one field, that is, one picture of the digital video signal produced from the A/D converter 31. Video processor circuit 3 is in data communication with microcomputer 1 by means of bi-directional data bus 18 that is connected to I/O port 15. Video processor circuit 3 is also connected to microcomputer 1 by selector switch 33 that has one fixed terminal connected to an output of color palette system 17. Switch 33 operates to selectively switch between the digital video signal fed by A/D converter 31 connected to the other fixed terminal thereof and the digital video signal, which is produced by microcomputer 1 in keeping with the present invention. The selected connection of switch 33 is under command of a keyboard (not shown) of microcomputer 1 and switch 33 connects the selected signal to digital-to-analog converter (D/A) 34 and, thence, to video monitor/receiver 4 for visual display. Video monitor/receiver 4 can be a conventional cathode ray tube (CRT) display. As a further system peripheral, a floppy disc memory system shown generally at 5 is provided that is connected to I/O port 16 by bi-directional bus 19. The floppy disc memory system 5 is operated as a video RAM similar to VRAM 13 but, of course, providing a greater memory capacity.

In operation of the graphics color data processing apparatus shown in FIG. 1, as the reproduced signal from video signal source 2, which in this embodiment may comprise a video tape recorder, is supplied to video processor circuit 3, each picture element, hereinafter referred to as a pixel, is converted to an eight-bit color data word by A/D converter 31. As shown clearly in FIG. 2, in that eight-bit word format, the color data comprises the well-known RGB signal, that is, the color data is divided into red, green, and blue segments, in which the red data segment is formed of three-bits, the green data segment is formed of three-bits, and the blue data segment is formed of two-bits. This digitized video signal, arranged such that each picture element forms an eight-bit data word, is fed from A/D converter 31 to one fixed terminal of selector switch 33 and, in the switch position shown in FIG. 1, the digitially converted video signal is fed back to a digital-to-analog converter 33 to be reconverted to the original analog signal and fed to the monitor/receiver 4 for visual display. This then is the original picture that is ultimately to be displayed utilizing the color graphics data processing apparatus provided by the present invention.

In addition to supplying the digital video signal from A/D converter 31 to a fixed terminal of selector switch 33, this signal is also supplied to the input of a one-field memory 32, whereby a signal corresponding to one picture at a predetermined time point, that is, a video signal comprising one field of the signal being displayed on monitor 4, is written into memory 32 in response to a suitable write command issued by microcomputer 1 and fed thereto on control line 20 by data bus 18. The generator of such write commands by a microcomputer are, of course, well known.

In response to a further command from microcomputer 1, the single field of the video signal stored in the memory 32 will ultimately be processed and converted to color picture data formed of the sixteen colors that are defined by color palette 17, as will be described hereinbelow. Subsequently, this color picture data, as converted through the operation of color palette 17, is transferred back to be stored in the floppy disc of floppy disc memory system 5, and such transfer can take place under supervision of the central processing unit 10 in the known fashion. The color picture data that was stored in the one-field memory 32 is retained until the contents thereof are commanded to be rewritten by the next write command from microcomputer 1.

The graphic data that will be formed by microcomputer 1 in keeping with the present invention can be selectively supplied by actuation of selector switch 33 to the monitor/receiver 4 for display thereon in place of the original video picture as first processed by A/D converter 31. Of course, the picture formed by the microcomputer 1 can always be displayed on any other cathode ray tube display, not only on a monitor as shown in FIG. 1.

Figure 2:
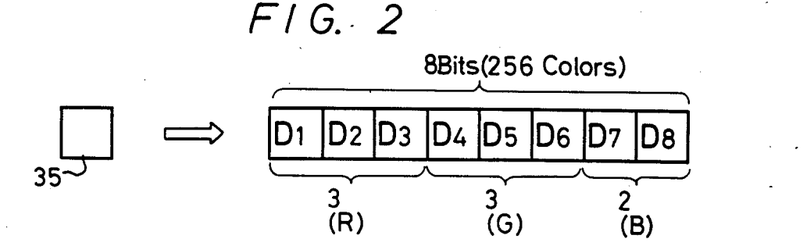
FIG. 2 is a representation of an eight-bit data word that forms a picture element of a color graphics display.
Figure 3:
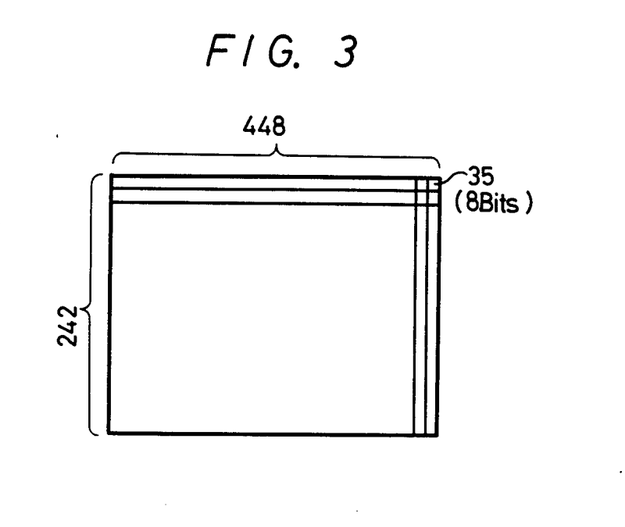
FIG. 3 is a representation of a video monitor screen formed of eight-bit picture elements.
Figure 4:
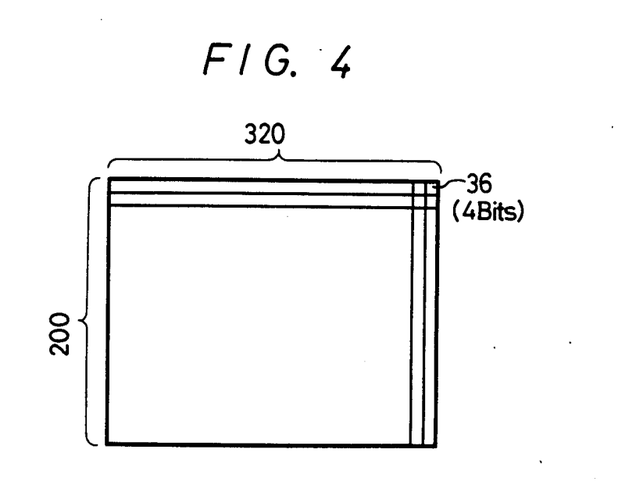
FIG. 4 is a pictorial representation of a video monitor screen formed of four-bit picture elements.

As depicted in FIG. 2, the original picture represented by the digital video signal produced by A/D converter 31 and displayed on video screen of monitor/receiver 4, is formed of a plurality of elements such that each picture element (pixel) 35 is formed of eight-bits. As shown in FIG. 3, these pixels are arranged in a row/column format, such that there are 448 pixels in each row and 242 pixels in each column, for the picture derived from the video signal source 2. On the other hand, a picture formed on receiver/monitor 4 derived from microcomputer 1 will have a different number of pixels in which each pixel is formed of four-bits, in place of the eight-bits, and a different number of pixels will then make up the video screen. As seen in FIG. 4, there are 320 pixels in each row and 200 pixels in each column. Thus, the picture formed by microcomputer 1 will necessarily be more coarse than the original picture formed by only the A/D and D/A converters derived from video signal source 2.

In this situation, because microcomputer 1 is functionally able to select and use sixteen desired colors from a much larger number of colors that are typically available, for example, 4096 colors ($2^{12}$), a color reproduction corresponding closely to the original can be made. In this particular embodiment, in order to represent, in pleasing and delicate fashion, the colors of the principal or important portions of the original picture, the color graphics data processing apparatus provided by the present invention defines automatically the sixteen colors that are used in color palette unit 17.

Figure 6:
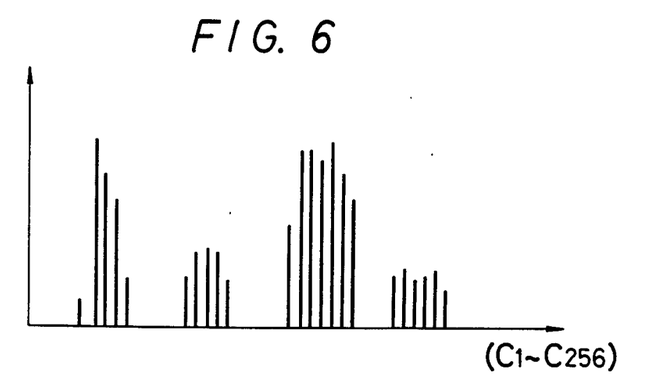
FIG. 6 is a graphical representation of the frequency of appearance of various, non-specified colors in color graphics data.
Figure 7:
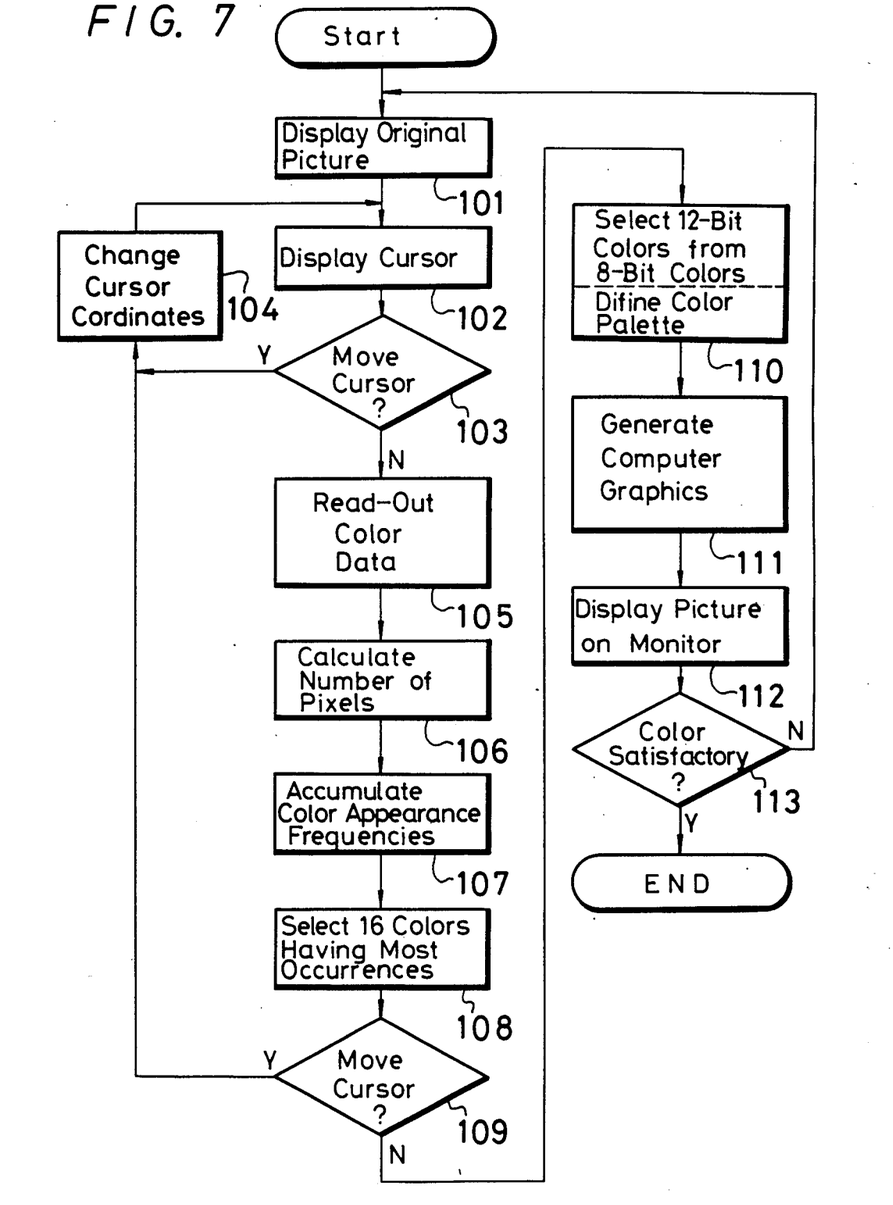
FIG. 7 is a flow chart showing a method for determining colors to be selected for a color palette employed in the system of FIG. 1.

The method utilized by the present invention for defining the contents of color palette 17 are hereinafter described with reference to FIGS. 5 through 7. More specifically, FIGS. 5A to 5D are pictorial representations useful in explaining one method for defining the contents of color palette 17, and in that regard, FIG. 7 is a flow chart illustrating a method that could be followed by microcomputer 1 or by a discrete component system to define such color palette contents. Referring then to FIG. 7, initially when the color palette defining method is commenced the digital signal from A/D converter 31 is first passed through switch 33, reconverted back into the analog signal by D/A converter 34 and displayed on receiver/monitor 4 as the original picture. This displayed original picture is the one in FIG. 3 that includes many more pixels, as compared with the picture that will be ultimately produced by microcomputer 1 following the present invention. The step of displaying the original picture is shown at 101 in the flow chart of FIG. 7. A cursor is then displayed on the original picture of the monitor receiver 4 of FIG. 1 and such cursor is shown as a rectangle 37 in FIGS. 5A through 5C. The cursor is generated and displayed at step 102 and, in this embodiment of the inventive method, cursor 37 is selected to circumscribe or enclose a portion of the picture comprised of 16 by 25 pixels. Movement of the cursor can be accomplished using known computer graphic techniques, and in this embodiment the next step 103 is to determine whether the original position of the cursor should be altered or moved. This is a decision made by the person operating the keyboard (not shown) of the microcomputer to determine whether the actual location of the cursor is to be moved. Of course, what is really taking place is that the addresses within the area encircled by the cursor on the screen of the monitor, which correspond to addresses in the field memory, are specified and, thus, the information contained within the cursor is made available by knowing the respective addresses.

Figure 5A:
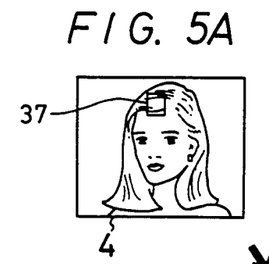
FIGS. 5A-5D are pictorial representations of a cathode ray tube having graphic information displayed thereon according to an embodiment of the present invention.
Figure 5B:
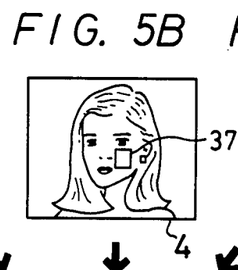
Figure 5C:
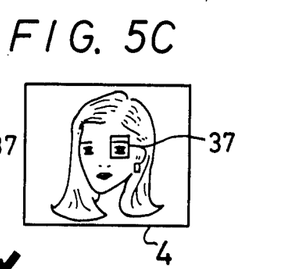

As the next step in the inventive method then, the user operates the keyboard (not shown) on microcomputer 1 to bring cursor 37 to the location on the color picture that the user wishes to emphasize, for example, skin tones or hair color in the images represented in FIGS. 5A–5C. This cursor movement is seen to take place at steps 103 and 104 of the method shown in FIG. 7 in which, more particularly, at step 103 it is determined whether the cursor 37 is to be moved or not and when the present position of cursor 37 is different from the desired position, the coordinates of the displayed cursor 37 are then altered as represented in step 104 and the cursor is once again displayed in step 102. On the other hand, if cursor 37 is in a desired position as determined by the operator, the routine represented in FIG. 7 moves to the next step 105.

Then, the color data of each pixel of the plurality of pixels, which in this case is 400 pixels contained within the area encircled by cursor 37, are read out from the one field memory 32 and latched into microcomputer 1, and when the color data of the entire 400 pixels have been latched into microcomputer 1, the appearance frequency of each color is calculated, as represented in step 106. Such appearance frequency pr frequency of occurrence is diagrammaticly represented for one case in FIG. 6, in which the appearance frequency distribution of the 256 colors available is shown. The 256 colors available are derived from the eight-bit words that were shown in FIG. 2. This type of frequency distribution representation, such as shown in FIG. 6, is commonly referred to as a histogram.

Continuing then in FIG. 7, the present appearance frequencies are accumulated at step 107, to obtain the appearance frequencies of the colors that have been determined up until now, and the inventive routine sequentially selects the desired sixteen colors from the accumulated frequency colors that have the highest numbers of appearance in step 108. In this embodiment, the initial value of the appearance frequencies is set at zero for each color, and the appearance frequency of each color is then sequentially accumulated anew each time the specified area (400 pixels) is changed or moved by movement of cursor 37. The accumulation of the appearance frequencies can be accumulated for all 256 colors ($2^8$) or from the appearance frequencies of only 32 colors based on the next previous 16 colors and the present 16 colors. In that case, in practice there will be less than 32 colors because some of the colors will overlap. In this way, it is essentially assured that the desired sixteen colors will be selected from higher appearance frequencies of all of the 256 colors.

If it does not appear to the user or operator that a color picture close to the original picture can be produced using the sixteen colors selected so far, the user must move cursor 37 to a different position by operating the keyboard (not shown) of microcomputer 1. It is understood, of course, that the term keyboard is used to include a joystick or other device capable being manipulated to change the position of the cursor on the screen, and that what really is taking place is that the addresses relative to the memory are being moved rather than the data being taken from the screen itself. In any event, at step 109, if it is determined that cursor 37 is to be moved to another position and the routine goes back to step 104 in which coordinates of the cursor appearing on the video screen are changed and the cursor 37 is displayed in its newly specified position.

For example, as represented in FIGS. 5A-5D, cursor 37 is moved on a depiction of a human face from a position corresponding to the person's hair, as shown in FIG. 5A, to the position of the person's cheek, as represented in FIG. 5B. Thereafter, the method steps 102 through 107 of the present invention, as explained hereinabove, are executed and once again the accumulated appearance frequencies of the respective colors are calculated and again the sixteen desired colors having the sixteen sequential highest frequency appearances are selected.

When cursor 37 is arranged as is shown in FIGS. 5A-5C, then sixteen colors are initially selected for color palette 17 based on the color of the hair, as seen in FIG. 5A, then sixteen colors are selected on the basis of the skin tones as seen in FIG. 5B, and then sixteen colors are selected based on the eye color, as seen in FIG. 5C. If a further step of cursor movement as a determined in decision block 109 is provided between steps 107 and 108 in the routine shown in FIG. 7, sixteen colors would not necessarily be selected at each position of the cursor but the appearance frequencies of the respective colors are determined based on color information from the plurality of important portions designated by the cursor, such as the three shown in FIGS. 5A-5C, and the sixteen colors of the color palette are then immediately selected.

After sixteen colors have been selected based on the colors of the important portions designated by locations of the cursor as described above, the colors on the color palette board corresponding to the sixteen colors, which are formed as in FIG. 2 as eight-bit color data words, are selected from the previously prepared 4096 colors that are available based on twelve-bit color data words, in accordance with a conversion table. Such conversion table is required to convert the eight-bit words to the twelve-bit words and, upon performing such conversion in step 112, the color palette colors are defined. In other words, based upon the steps performed in accordance with the routine of FIG. 7 described above, sixteen colors are first selected from an available 256 colors formed of eight-bit color data words and then sixteen colors are selected that respectively correspond to the colors closest to the desired colors from 4096 colors formed of twelve-bit words, in this way, the selected sixteen colors are defined as the color palette. Such sixteen colors as defined in this fashion are stored in the floppy disc memory of the floppy disc memory system 5 under control of the central processing unit by transferring through I/O bus 16 and bi-directional data bus 19.

Figure 8:
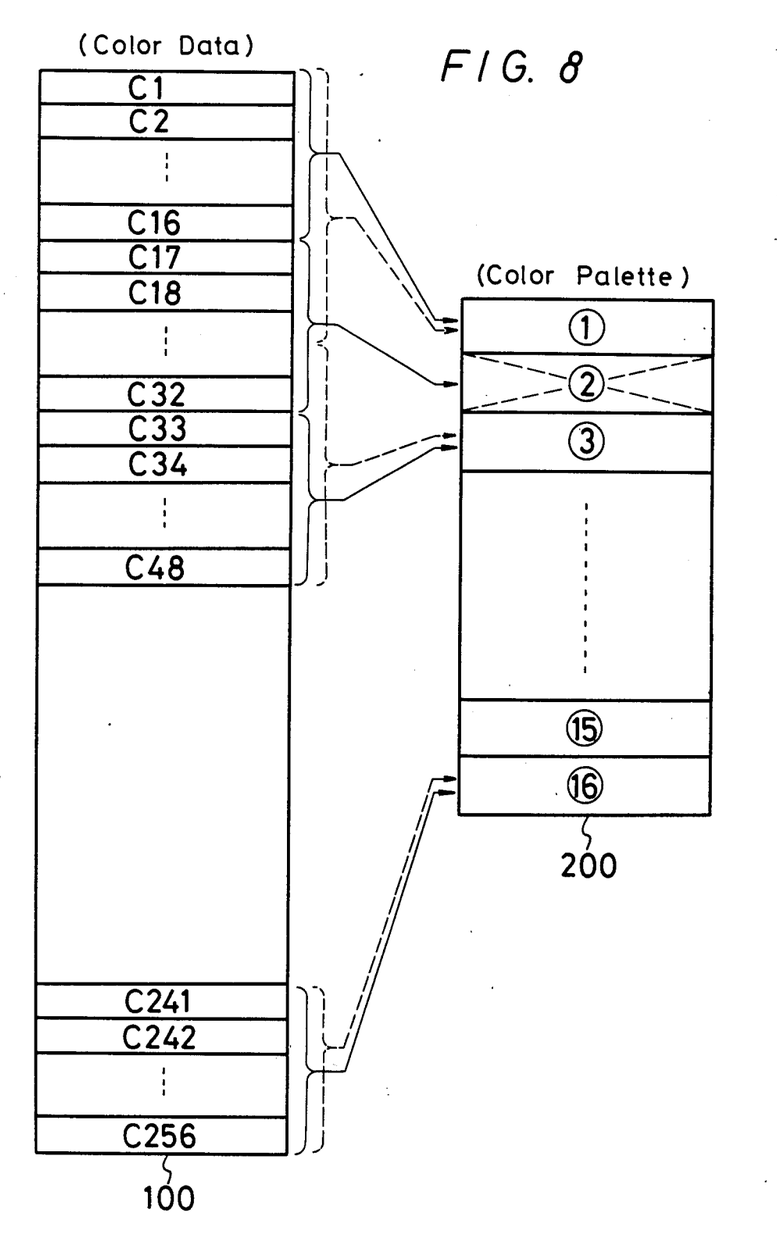
FIG. 8 is a graphical representation of a color converter for use in converting color data used in a color palette employed in the system of FIG. 1.

After color palette 17 is defined as described above, the inventive method then proceeds to generate the desired computer graphics as represented in step 111. In this operation, a corresponding relationship is calculated between the colors of the picture stored in the single-frame memory 32 and the sixteen colors that have now been calculated for the color palette. FIG. 8 is a graphical representation of the corresponding relationship among the various colors and, referring to FIG. 8, the color data is shown at 100 as comprising 256 eight-bit color data words, C1 to C256, from which the color data of the picture from the single-field memory 32 can be selected. The color palette is represented at 200 and the various selected sixteen colors are shown arranged from ① to ⑯. In this case, as represented by the solid brackets and arrows in FIG. 8, the sixteen colors forming the color palette represented at 200 are selected from the 256 colors such that color ① is assigned to, for example, the data words represented at C1 through C16, the color ② is assigned to the data C17 to C32, and so on down through the available 256 colors. In accordance with this conversion table represented in FIG. 8, the colors ① through ⑯ are selected for the respective dots or picture elements making up the picture from memory 32.

Figure 5D:
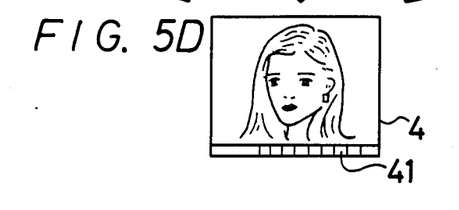

After a color corresponding to every dot or picture element of the picture retained within memory 32 has been selected, the transfer command for transferring the picture of one field retained within memory 32 to the microcomputer 1 is executed so that, in accordance with the conversion table represented in FIG. 8, the color of each pixel of the picture displayed by microcomputer 1 is assigned a four-bit data word from one of the sixteen colors and then this four-bit data is written into the floppy disc of floppy disc memory system 5. At that point, selector switch 33 is changed over by operating the keyboard (not shown) of microcomputer 1, and the color picture formed by microcomputer 1, which is now also stored in the floppy disc memory system 5, is displayed on monitor/receiver 4 as represented in FIG. 5D having a format shown in FIG. 4. Such operation is graphically depicted as step 112 in the routine represented in FIG. 7. Then, in accordance with the conversion table, the four-bit color selection data is converted to the color data of twelve-bits and each dot is assigned a color. Then, the displayed computer graphics is compared by the operator with the original picture image by changing over selector switch 33, typically by operating the keyboard (not shown) of the microcomputer 1. If the user is not satisfied with the selected colors, the definition of the color palette is once again carried out. More particularly, the operative steps 101 to 110 are repeated and the subsequently generated computer graphics is displayed once again on monitor/receiver 4 by execution of steps 111 and 112. The decision as to whether the color image produced following the computer graphic techniques is satisfactory is represented by the decision of block 113 in the routine of FIG. 7. Once the user is satisfied with the color selected by the color palette the routine required to define the color palette terminates.

In the event that there are some colors from the sixteen defined colors which the user does not wish to use, these may be specified. To accommodate this, when the user switches between the actual video image displayed on monitor/receiver 4 and the computer graphics image displayed on monitor/receiver 4 by microcomputer 1, the user can specify the colors which are desired not to be displayed by identifying them by letters such as A, B, C, and the like, which are displayed together with all of the sixteen selected colors at a lower edge portion 41 of the screen of the monitor/receiver 4, as represented in FIG. 5D. For example, if the color of ② in FIG. 8 is to be inhibited, a corresponding relationship among the remaining 15 colors on the color palette and the colors of the picture memory 32 is then recalculated leaving out all of the colors that would typically be contained within ②. The deletion of ② is represented by the crossed dashed lines in FIG. 8. The recalculated relationships are then shown by the dashed brackets and arrows connecting the color data 100 with the color palette 200, and in which it is seen that the color data C17 to C32 that had previously been made to correspond to color ② is now used by the picture of memory 32 spread between the the color ① and ③ of the color palette 200. These are chosen as being those colors that are closest to the color of ②. Now, in continuing the example, the color data of C17 to C24 are made to correspond to the color of ① and the color data C25 to C32 are made to correspond to the color of ③. Then, in keeping with the conversion table of FIG. 8 having corresponding relationships as described above, one color from the available 15 colors on a color palette is selected for each dot of the picture from memory 32 when the color graphic is to be displayed on the monitor/receiver 4.

The color to be excluded from the display need not limited to a single color and, thus, when it is desired to inhibit n colors (n greater than 1), then the colors of the palette equal to (16−n) are used and a new corresponding relationship among the (16−n) colors and the 256 colors provided by the picture stored in memory 32 is recalculated. In this fashion, the conversion table graphically represented in FIG. 8 is renewed. Accordingly, when the user specifies an undesired color in the already defined color palette and inhibits the use of such undesired color, the computer graphic is formed by colors other than the inhibited color. For example, it is possible for the user to use only warm colors to make a computer graphic with the colors closest to the color of the original picture selected only from warm colors by inhibiting all use of cool colors. Accordingly, the user can easily generate computer graphics having the desired hue.

Although in the above-described embodiment, N colors on the color palette can automatically be selected based upon the color of an important portion of the original picture, nevertheless, the invention can also be applied to a case in which there are N colors that are fixed or predetermined or selected manually.

According to the present invention described above, when the user desires to generate a computer graphics having colors close to those of the original picture, the color palette can be defined based upon the color of the important portion of the original picture, whereby a computer graphic more faithful to the original picture can be easily generated.

Furthermore, because it is not necessary for the user to define the color palette each time but only to specify the important portion of the picture by using the cursor, then such defining is performed easily. Also, according to the present invention, if a number n of unnecessary colors of a total of N colors on the color palette are specified, then a conversion table for converting the M number of colors used in the original picture to the color palette colors, where M is greater than N, is formed into a conversion table for converting M colors to (N - n) colors, whereby the computer graphics is formed only of the colors (N - n). In this fashion, the user can obtain a computer graphics made only of warm colors or only of cool colors, as desired, with relative ease.

Similar computer graphics techniques are described in pending application Ser. No. 06/713,612 filed Mar. 19, 1985, now U.S. Pat. No. 4,646,134, assigned to the assignee hereof, and the relevant portions thereof are incorporated herein by reference.

The above description is provided for various preferred embodiments of the invention, however, it will be apparent that many modifications and variations could be effected by one skilled in the art without departing from the spirit or scope of the novel concepts of the invention, which should be determined only by the appended claims.

What is claimed is:

1. Color graphics data processing apparatus for use in displaying a color picture based on an input analog color video signal, comprising:
    an analog-to-digital converter for converting an input analog color video signal to a digital color video signal;
    original picture memory means for storing a plurality of color picture elements constituting a one-picture portion of said digital color video signal from said analog-to-digital converter;
    means for sequentially reading out from said original picture memory means respective picture elements of said digital color video signal and for counting frequencies of appearance of each color of color data of said plurality of picture elements;
    color determining means responsive to the frequencies of appearance of said color data for selecting a predetermined number of colors having relatively higher frequencies of appearance;
    video converting and memory means responsive to said color determining means for sequentially color converting and storing said color data of said digital color video signal from said original picture memory means;
    color palette means for producing a predetermined number of display colors in response to said converted color data read out from said video converting and memory means; and
    video display means receiving said display colors from said color palette for displaying said color picture.

2. Apparatus according to claim 1, further comprising cursor generating means for selecting a predetermined portion of a video signal of said video display means, in which said means for sequentially reading out and counting is adapted to count color data of picture elements of a picture on said display means in said predetermined portion selected by said cursor generating means.

3. Apparatus according to claim 2, in which said cursor generating means generates a rectangularly shaped area forming said predetermined portion.

4. Apparatus according to claim 2, in which said means for sequentially reading out and for counting counts appearing frequencies of color data by accumulating picture elements within said area determined by said cursor.

5. A color graphics data processing apparatus according to claim 1, in which the color data of said digital color video signal is formed of 8 bits.

6. Apparatus according to claim 5, in which 8-bit color data is formed having 3 bits assigned to read color, 3 bits assigned to green color, and 2 bits assigned to blue color.

7. Apparatus according to claim 1, in which each display color of said color palette is formed of 16 bits.

8. Apparatus according to claim 1, in which said color palette is adapted to produce 16 display colors from 4096 colors.

9. Apparatus according to claim 1, in which said color determining means is adapted to select 16 colors of higher frequencies of appearance.

10. Apparatus according to claim 9, in which said 16 colors are each formed of 4 bits.

11. Apparatus according to claim 1, further comprising display inhibiting means for inhibiting the display of a color specified by said display inhibiting means.

12. A color graphics data processing apparatus according to claim 11, in which said display inhibiting means includes a warm color table and a cool color table, whereby said color picture can be displayed only by selected ones of said warm color or cool color.

13. Apparatus according to claim 1, further comprising an external memory for storing said color data of said digital color video signal.

14. Apparatus according to claim 13, in which said external memory comprises a floppy disc magnetic memory.

15. A method for processing computer graphics data and displaying a color picture based on an input analog color video signal, comprising the steps of:

digitally converting the analog color video signal to a digital color video signal;

storing a selected single picture portion formed of a plurality of picture elements of said digital color video signal;

sequentially reading out color data of respective picture elements of said stored digital color video signal;

counting a number of appearances of each color of the color data of said picture elements;

selecting a predetermined number of colors having a relatively higher number of appearances;

sequentially color converting and storing said color data of said digital color video signal that was previously stored;

producing a limited number of color palette colors from converted color data; and displaying said color picture based on said color palette colors.

16. A method according to claim 15, further comprising generating a cursor for selecting a predetermined area on a video screen of a displayed picture, and in which said step of counting includes counting color data of picture elements within a predetermined area selected by said cursor.

17. A method according to claim 16, in which said step of generating a cursor includes generating a rectangularly shaped area.

18. A method according to claim 16, in which said step of counting includes counting numbers of appearances of color data by accumulating picture elements within said cursor.

19. A method according to claim 18, in which said step of counting further includes repeatedly counting and accumulating the color data of picture elements within said cursor.

20. A method according to claim 15, further comprising the step of forming the color data of said digital color video signal having 3 bits assigned to red color, 3 bits assigned to green color, and 2 bits assigned to blue color.

* * * * *